United States Patent
Knapp

(10) Patent No.: US 10,968,621 B2
(45) Date of Patent: Apr. 6, 2021

(54) CONNECTOR FOR TWO WORKPIECES

(71) Applicant: KNAPP GMBH, Euratsfeld (AT)

(72) Inventor: Friedrich Knapp, Bad Kreuzen (AT)

(73) Assignee: KNAPP GMBH, Euratsfeld (AT)

( * ) Notice: Subject to any disclaimer, the term of this patent is extended or adjusted under 35 U.S.C. 154(b) by 0 days.

(21) Appl. No.: 16/640,097

(22) PCT Filed: Sep. 12, 2018

(86) PCT No.: PCT/EP2018/074561
§ 371 (c)(1),
(2) Date: Feb. 19, 2020

(87) PCT Pub. No.: WO2019/053041
PCT Pub. Date: Mar. 21, 2019

(65) Prior Publication Data
US 2020/0399887 A1 Dec. 24, 2020

(30) Foreign Application Priority Data
Sep. 18, 2017 (EP) ..................... 17191575

(51) Int. Cl.
*E04B 1/26* (2006.01)
*E04B 1/41* (2006.01)
*E04B 1/38* (2006.01)

(52) U.S. Cl.
CPC .............. *E04B 1/2604* (2013.01); *E04B 1/40* (2013.01); *E04B 2001/2628* (2013.01);
(Continued)

(58) Field of Classification Search
CPC .............. E04B 1/40; E04B 2001/0286; E04B 2001/2628; E04B 2001/04–05
See application file for complete search history.

(56) References Cited

U.S. PATENT DOCUMENTS

| 3,269,889 A * | 8/1966 | Hutchins | D21H 5/183 |
| | | | 162/155 |
| 5,966,882 A * | 10/1999 | Naito | E02D 27/42 |
| | | | 52/295 |
| 2019/0390455 A1 * | 12/2019 | Knapp | E04B 1/40 |

FOREIGN PATENT DOCUMENTS

| CH | 257965 A * | 11/1948 | ........... E04B 1/2604 |
| DE | 29802951 U1 * | 6/1999 | ........... E04B 1/2604 |

(Continued)

OTHER PUBLICATIONS

Extended European Search Report, dated Apr. 6, 2018.
(Continued)

*Primary Examiner* — Jeanette E Chapman
(74) *Attorney, Agent, or Firm* — Hoffmann and Baron, LLP

(57) ABSTRACT

The present disclosed subject matter relates to a connector for two workpieces, which are in particular made of wood. The connector comprises a first and a second fitting which may be mounted on one of the workpieces each by their one side and may be anchored to one another by their other sides, and which each have a circumferential edge between their one and other side. At least the first fitting has a projection with an undercut on its other side and the second fitting has a slot, starting from its edge and corresponding to the undercut, for anchoring the projection. At least one of the fittings has a protrusion on its other side and running transverse to the direction of the slot for resting of the edge of the other fitting when the projection is in the position anchored in the slot.

8 Claims, 5 Drawing Sheets

(52) U.S. Cl.
CPC ............... *E04B 2001/2644* (2013.01); *E04B 2001/2652* (2013.01); *E04B 2001/405* (2013.01)

(56) References Cited

FOREIGN PATENT DOCUMENTS

| | | | |
|---|---|---|---|
| DE | 10227661 B3 | 1/2004 | |
| DE | 10326196 B3 | 11/2004 | |
| DE | 102010018593 A1 * | 10/2011 | ........... E04B 1/2604 |
| EP | 1764447 A2 * | 3/2007 | ............. E04B 2/965 |
| EP | 2700636 A1 * | 2/2014 | ........... C07D 331/02 |
| GB | 1087401 A | 7/1964 | |
| WO | WO-2007055385 A1 * | 5/2007 | ........... E04B 1/2604 |

OTHER PUBLICATIONS

International Search Report with ISA Opinion, dated Sep. 26, 2018.
International Preliminary Report on Patentability in corresponding PCT application, dated Mar. 24, 2020.

* cited by examiner

CONNECTOR FOR TWO WORKPIECES

CROSS-REFERENCE TO RELATED APPLICATIONS

This application is a National Phase application of International Application No. PCT/EP2018/074561 filed Sep. 12, 2018, which claims priority to European Patent Application No. 17 191 575.4 filed Sep. 18, 2017, the disclosures of which are incorporated herein by reference.

TECHNICAL FIELD

This disclosed subject matter relates to a connector for two workpieces, which are in particular made of wood.

BACKGROUND

Connectors of this kind are known for example from DE102 27 661 B3 and EP1 856 417 B1 and are sold under the trademark RICON® S by the company Knapp GmbH, Euratsfeld, Austria. They are particularly suitable for the construction of connections capable of bearing heavy loads in the field of timber engineering, for example for the connection of main beams, secondary or cross beams, cross passes, trusses, pillars, posts, walls, or the like. The fittings are usually made of metal, for example high-strength aluminium, and the workpieces to be connected are usually made of wood, for example glued laminated timber (GLT), laminated beams, etc. At least one of the workpieces may alternatively be made of concrete, stone, masonry, or even metal, for example.

Documents DE10326196 B3 and GB 1 087 401 A also describe connectors in which one of the fittings has, on one side, a protrusion running transversely to the direction of the slot for bearing against the other fitting.

BRIEF SUMMARY

The objective of the disclosed subject matter is to further improve a connection of this kind in respect of its load-bearing capability, durability and overall size such that it may durably withstand greater forces with constant weight or constant overall size.

This objective is achieved with a connector comprising a first and a second fitting each having one side and an other side, which each of said fittings may be mounted on one of the workpieces by its respective one side and which fittings may be anchored to one another by their respective other sides, and which fittings each have a circumferential edge between their one and other side, wherein at least the first fitting has a projection with an undercut on its other side and the second fitting has a slot, starting from its edge and corresponding to the undercut, for anchoring the projection, wherein at least one of the fittings has a protrusion on its other side and running transverse to the direction of the slot for resting of the edge of the other fitting when the projection is in the position anchored in the slot, and wherein the projection is formed by a stud which protrudes from the aforesaid other side and has a widened head, said stud being mounted axially movably on the first fitting and being spring-loaded with its head towards the aforesaid one side of the first fitting.

In a connector of this kind it is not solely the projection and slot that support the forces, in particular bearing forces, acting on the connector by the two workpieces, but instead an at least significant part thereof is supported by the edge of the fitting bearing against the protrusion of the at least one, other fitting. The stud also may be produced easily. By mounting the stud on the first fitting, on the one hand inaccuracies in the workpieces may be balanced out and on the other hand impact loads, which for example occur in the case of an earthquake or the like, are taken up by the spring and thus kept away from the workpieces, without the connector sustaining any damage. The connector, with unchanged, secure anchoring of the two fittings to one another, may thus durably withstand greater forces with constant overall height, or the same forces with smaller overall size.

The protrusion may be screwed here to the particular fitting. However, the protrusion may take up particularly high forces if it is formed integrally on the fitting or is welded thereto, as is preferred.

It is favourable if the protrusion is cuboidal and is penetrated by bores for receiving screws for mounting on one of the workpieces. This leads to a simultaneously compact and robust protrusion, which may transmit forces directly onto the workpiece. It is advantageous if at least one of the bores passes through the protrusion at an acute angle to the one side of the fitting and if the protrusion has a chamfer, from which this bore starts. This leads to an inclined introduction of force into the workpiece and counteracts an expansion or splitting of the end face of the workpiece, in particular if the workpiece is made of wood and the fitting is mounted on the end face thereof. As a result of the chamfer, screws may also be screwed in more easily and have an improved fit on the protrusion.

In an advantageous embodiment at least one of the bores has a cylindrical widening on the one side of the fitting. The aforesaid cylindrical widening may be fitted for example over the head of a screw screwed into the workpiece prior to mounting of the fitting, and the fitting may in this way be reliably positioned for the mounting on the workpiece.

It is also particularly favourable if the fittings are substantially congruent and have edge portions approximately parallel to the aforesaid slot, wherein cheeks are formed at the edge portions of at least one of the fittings, between which cheeks the other fitting is held laterally when the projection is in the position anchored in the slot. In this way, lateral forces such as shear forces may also be taken up at least in part by the cheeks, and the loading of the projection may thus be further reduced. Furthermore, the connector could thus be used at an incline or even horizontally as compared to its usual mounting direction with vertical slot without the projection or slot being overloaded.

For easier insertion of the undercut of the projection into the slot when anchoring the two fittings against one another, the slot preferably has a V-shaped mouth.

The two fittings may on the one hand be completely different from one another, wherein merely the first fitting has the projection and the second fitting has the slot, merely one of the fittings has the aforesaid stop and/or merely one of the fittings has the aforesaid optional cheeks. However, both fittings preferably have an identical form or are mirror-symmetrical to one another. The structure and handling of the connector are thus considerably simplified, in particular if the fittings have an identical form.

BRIEF DESCRIPTION OF THE DRAWINGS

The disclosed subject matter will be explained in greater detail hereinafter with reference to exemplary embodiments shown in the accompanying drawings, in which.

DETAILED DESCRIPTION

Figure 1A:
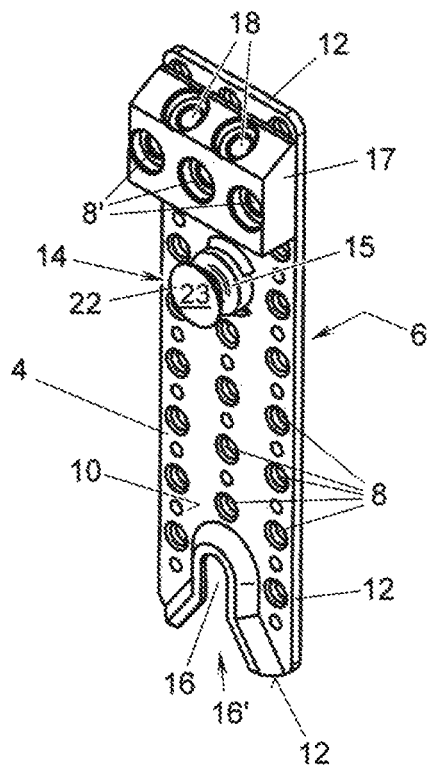
FIGS. 1a and 1b show a fitting (FIG. 1a) and a connector for two workpieces having two such fittings (FIG. 1b), in each case in a perspective view obliquely from above.
Figure 1B:
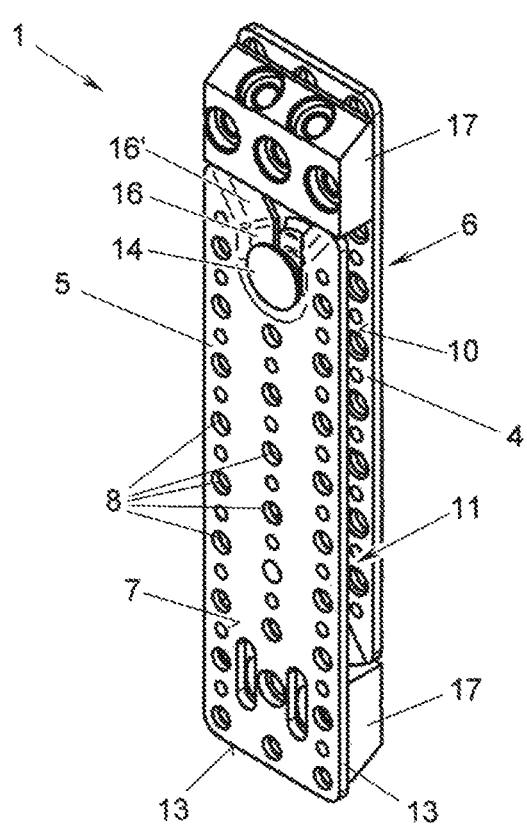

FIGS. 1a, 1b, 2a and 2b show examples for a connector 1 for two workpieces 2, 3 made of wood, in particular glued laminated timber, made of concrete, masonry, stone, metal or the like, for example beams and/or vertical components, for example pillars, posts or walls. The connector 1 has a first and a second fitting 4, 5. The first fitting 4 is mounted with one of its sides 6 on one of the workpieces 2, 3, and the second fitting 5 is mounted with its other side 7 on the other of the workpieces 2, 3. To this end, each of the fittings 4, 5 for example has bores 8 for screws 9, nails, pins or the like, which are anchored in the relevant workpiece 2, 3.

By means of its other side 10, the first fitting 4 is anchored on the other side 11 of the second fitting 5, and the two workpieces 2, 3 are in this way connected to one another. The two fittings 4, 5 have a circumferential edge 12, 13 between their one and other sides 6, 7, 10, 11 respectively.

Figure 2A:
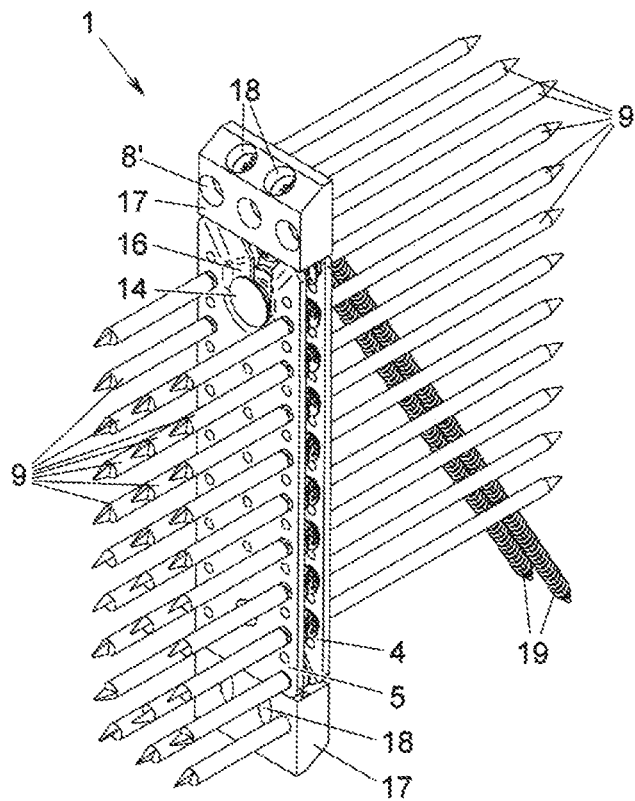
FIGS. 2a and 2b show a variant of the connector from FIG. 1b in its mounting position without workpieces in a perspective view obliquely from above (FIG. 2a) and on two workpieces shown in part in a side view (FIG. 2b)
Figure 2B:
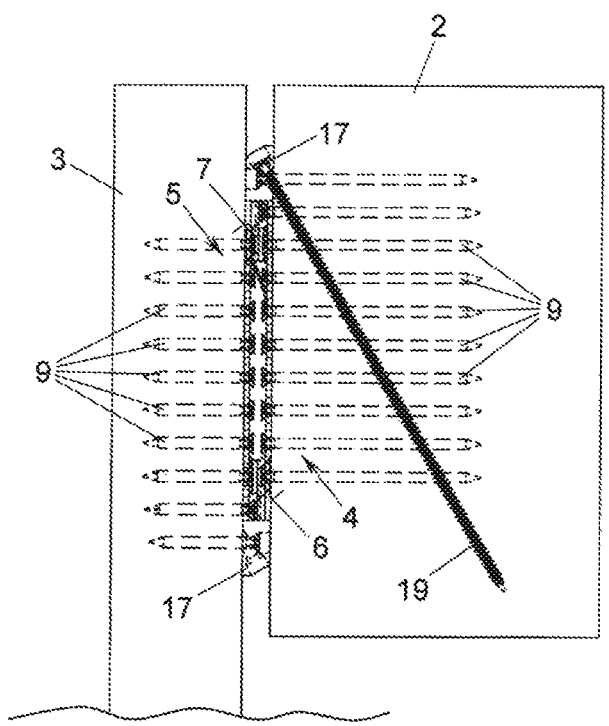

In order to anchor the two fittings 4, 5 against one another by means of their other sides 10, 11, at least the first fitting 4 has, on its other side 10, a projection 14 with an undercut 15 and at least the second fitting 5 has a slot 16, starting from its edge 13 and corresponding with the undercut 15, in which slot the projection 14 of the first fitting 4 is anchored by inserting the undercut 15 into the slot 16. It goes without saying that the first fitting 4 may be the fitting that is mounted on the workpiece 2 to be supported, for example a beam, and the second fitting 5 is the fitting that is mounted on the workpiece 3 to be supported, for example a post, as shown in the example of FIG. 2b, or vice versa.

To facilitate the insertion of the projection 14 with its undercut 15 into the slot 16, the slot optionally has a V-shaped mouth 16'. The slot 16 may penetrate the second fitting 5 from its one side 7 to its other side 11, as in the shown examples, or on the other hand may be embodied merely as a groove in the other side 11 of the second fitting 5. The slot 16, as in the example of FIG. 1a, may optionally be adapted to the form of the undercut 15 of the projection 14—here: chamfered—and, if desired, may be raised on the other side 11. The fittings 4, 5 may be largely plate-like, as in the shown examples, or may have another suitable cross-section. In addition, both fittings 4, 5, as in the example of FIG. 1b, may optionally have an identical form or may be mirror-symmetrical to one another, such that both the first fitting 4 and the second fitting 5 each have a projection 14 with undercut 15 and a slot 16 for anchoring the projection 14 of the other fitting 4, 5.

At least one of the fittings 4, 5, on its other side 10, 11, has a protrusion 17 running transversely to the direction of the slot 16. The edge 12, 13 of the other fitting 4, 5 rests on this protrusion 17 when the projection 14 is in its position anchored in the slot 16. The protrusion 17 is formed integrally on the relevant fitting 4, 5, for example by bending or moulding, or is welded thereto, for example on the aforesaid other side 10, 11 as in the example of FIG. 1a, or on the edge thereof 12, 13 as in the example of FIG. 2a. Alternatively, the protrusion 17 may be screwed onto the relevant fitting 4, 5 or may be fastened to the fitting 4, 5 by anchoring on the relevant workpiece 2, 3 through bores 8' penetrating the one and the other side 6, 7, 10, 11 of the fitting 4, 5.

Figure 3A:
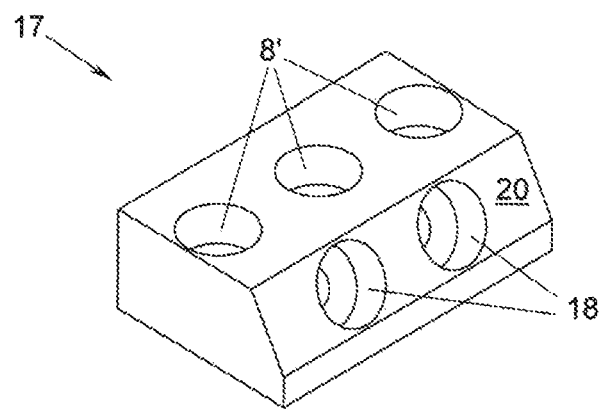
FIGS. 3a to 3c show variants of a protrusion of the connector from FIG. 1b, 2a or 2b in a perspective view obliquely from above (FIG. 3a), in a cross-section (FIG. 3b), and in a side view (FIG. 3c)
Figure 3B:
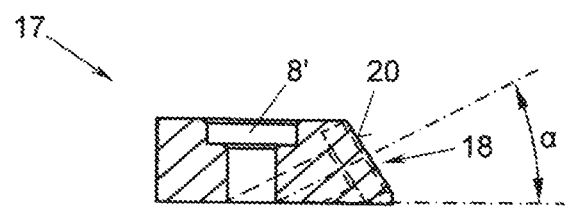
Figure 3C:
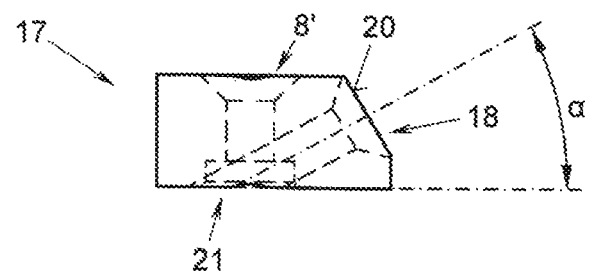

In the exemplary embodiments of FIGS. 3a to 3c the protrusion 17 is cuboidal. Alternatively, the protrusion 17 may also have another form that is suitable for supporting the bearing edge 12, 13 of the other fitting 4, 5 at least in part. The protrusion 17 of the examples shown in FIGS. 3a to 3c is penetrated by bores 8' for receiving screws 9 for mounting on one of the workpieces 2, 3. In the examples of FIGS. 3a to 3c the protrusion 17 optionally has at least one bore 18 (in the example of FIG. 3a: two bores 18) which penetrates the protrusion 17 at an acute angle α to the aforesaid one side 6, 7 of the fitting 4, 5, so as to allow the fitting 4, 5 to be screwed to the workpiece 2, 3 at an incline with the aid of screws 19. The protrusion 17 in this example has an optional chamfer 20, from which the inclined bore 18 (here: at a right angle) starts.

The bores 8, 18 are optionally recessed, for example cylindrically (FIG. 3b) or conically (FIG. 3c). In the exemplary embodiment of FIG. 3c, one of the bores 8' also has a cylindrical widening 21 on the one side 6, 7 of the fitting 4, 5 for receiving a head of a positioning screw screwed preliminarily in the workpiece 2, 3 or a head of a positioning pin (not shown) for the fitting 4, 5.

Figure 4:
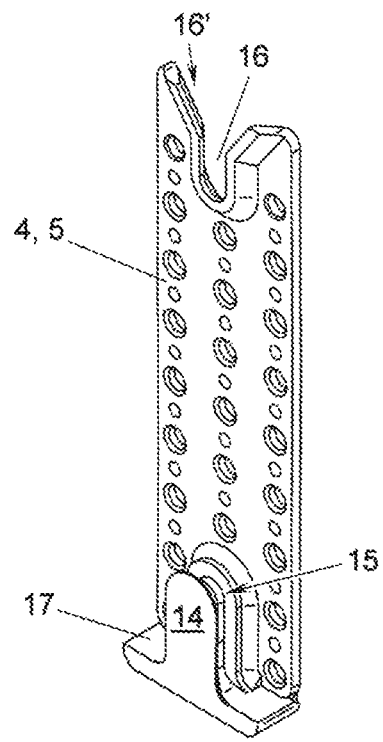
FIGS. 4, 5, 6a and 6b show further embodiments of the fittings of the connector, more specifically a variant in a perspective view obliquely from above (FIG. 4), another variant with a projection according to the disclosed subject matter in a side view (FIG. 5), and a further variant, in each case in a perspective view obliquely from above (FIGS. 6a and 6b).

In the exemplary embodiment of FIG. 4 the projection 14 is formed integrally with the protrusion 17, for example as a convexity of the protrusion 17 with undercut 15. In this example the protrusion 17 is also shown in its variant without bores 8', 18, which is optional for all embodiments.

Alternatively, the projection 14 is formed in the further shown examples by a stud 22 protruding from the aforesaid other side 10, 11, which stud has a widened head 23, whereby the undercut 15 is formed between the head 23 and other side 10, 11. The head 23 for example may be spherical, cylindrical or, as shown, conical. In the example of FIG. 1a the stud 22 is welded to the fitting 4, 5; it may alternatively be screwed on.

Figure 5:
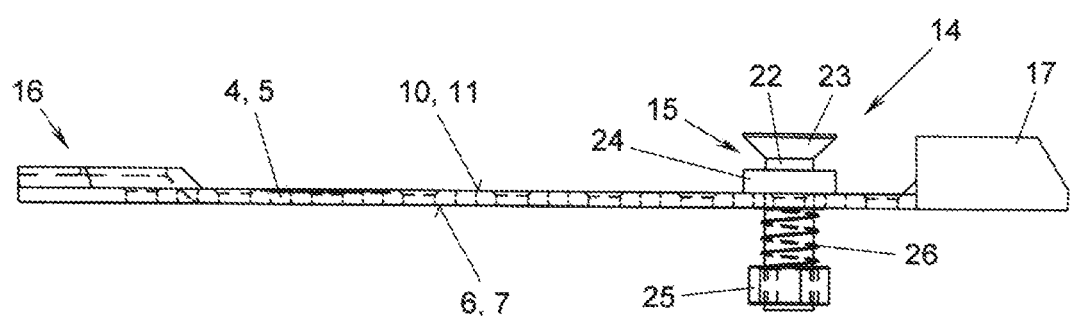

FIG. 5 shows an alternative example according to the disclosed subject matter in which the stud 22 is mounted axially movably on the fitting 4, 5 and is spring-loaded by its head 23 towards the aforesaid one side 6, 7 of the relevant fitting 4, 5. In this example the stud 22 penetrates through both sides 6, 7, 10, 11 of the fitting 4, 5, on the other side 10, 11 has a stop 24, and at its end opposite the head 23 has a flange 25 for acting on a spring 26 clamped between the flange 25 and the one side 6, 7 of the fitting 4, 5. Other variants of the spring loading of an axially movable stud 22 are very well known to a person skilled in the art.

Figure 6A:
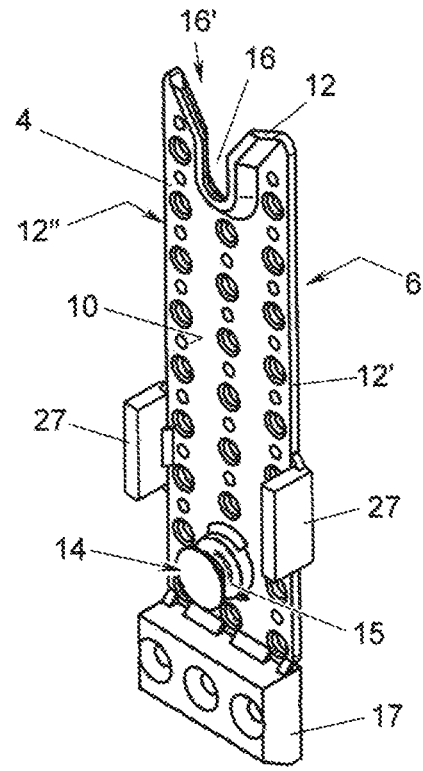
Figure 6B:
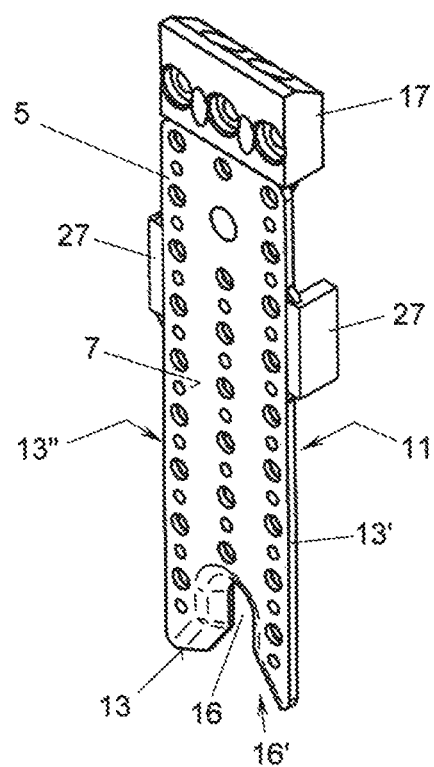

In a further embodiment according to FIGS. 6a and 6b the fittings 4, 5 are sub-stantially congruent and have edge portions 12', 12", 13', 13" approximately parallel to the aforesaid slot 16. Cheeks 27 are formed at the aforesaid edge portions 12', 12", 13', 13" of at least one of the fittings 4, 5 here: both fittings 4, 5 with the other fitting 4, 5 being held laterally between said cheeks when the projection 14 is in the position anchored in the slot 16, such that the cheeks 27 transfer lateral forces between the two fittings 4, 5. It goes without saying that, with a suitable mirror-symmetrical embodiment of the fittings 4, 5, each fitting 4, 5 could also have a cheek 27 merely on one of its edge portions 12', 12", 13', 13" and not on both, to the same effect.

The disclosed subject matter is not limited to the presented embodiments, but comprises all variants, modifications and combinations that fall within the scope of the accompanying claims.

What is claimed is:

1. A connector for two workpieces, comprising:
a first and a second fitting each having one side and an other side, which each of said fittings may be mounted on one of the workpieces each by its respective one side and which fittings may be anchored to one another by their respective other sides, and which fittings each have a circumferential edge between their one and other side,
wherein at least the first fitting has a projection with an undercut on its other side and the second fitting has a slot, starting from its edge and corresponding to the undercut, for anchoring the projection,
wherein at least one of the fittings has a protrusion on its other side and running transverse to the direction of the slot for resting of the edge of the other fitting when the projection is in the position anchored in the slot, wherein the projection is formed by a stud which protrudes from said other side and has a widened head, said stud being mounted axially movable on the first fitting and being spring-loaded with its head towards said one side of the first fitting.

2. The connector according to claim 1, wherein the protrusion is formed integrally on said at least one of the fittings or is welded thereto.

3. The connector according to claim 1, wherein the protrusion is cuboidal and is penetrated by bores for receiving screws for mounting on one of the workpieces.

4. The connector according to claim 3, wherein at least one of the bores penetrates the protrusion at an acute angle to the one side of said at least one of the fittings, and the protrusion has a chamfer from which this at least one of the bores starts.

5. The connector according to claim 3, wherein at least one of the bores has a cylindrical widening on the one side of said at least one of the fittings.

6. The connector according to claim 1, wherein the fittings are substantially congruent and have edge portions approximately parallel to the aforesaid slot, wherein cheeks are formed at the edge portions of at least one of the fittings, with the other fitting being laterally held between said cheeks when the projection is in the position anchored in the slot.

7. The connector according to claim 1, wherein the slot has a V-shaped mouth.

8. The connector according to claim 1, wherein both fittings have an identical form or are mirror-symmetrical to one another.

\* \* \* \* \*